US012589313B2

(12) United States Patent
Kosugi et al.

(10) Patent No.: US 12,589,313 B2
(45) Date of Patent: Mar. 31, 2026

(54) PROGRAM, METHOD, AND INFORMATION PROCESSING DEVICE

(71) Applicant: The Pokemon Company, Tokyo (JP)

(72) Inventors: Kaname Kosugi, Tokyo (JP); Marie Shuto, Tokyo (JP); Yuki Terada, Tokyo (JP); Koya Nakahata, Tokyo (JP); Takumi Tsukada, Tokyo (JP); Keisuke Miyagawa, Tokyo (JP)

(73) Assignee: The Pokémon Company, Tokyo (JP)

( * ) Notice: Subject to any disclaimer, the term of this patent is extended or adjusted under 35 U.S.C. 154(b) by 328 days.

(21) Appl. No.: 18/201,767

(22) Filed: May 25, 2023

(65) Prior Publication Data

US 2023/0294000 A1 Sep. 21, 2023

Related U.S. Application Data

(63) Continuation of application No. PCT/JP2021/042186, filed on Nov. 17, 2021.

(30) Foreign Application Priority Data

Nov. 30, 2020 (JP) ................................. 2020-198620

(51) Int. Cl.
*A63F 13/00* (2014.01)
*A63F 13/69* (2014.01)
*A63F 13/79* (2014.01)
(52) U.S. Cl.
CPC .............. *A63F 13/69* (2014.09); *A63F 13/79* (2014.09)
(58) Field of Classification Search
CPC ................................. G06F 3/011; G06F 3/015
See application file for complete search history.

(56) References Cited

U.S. PATENT DOCUMENTS

| | | | | |
|---|---|---|---|---|
| 10,646,166 | B2 * | 5/2020 | Kido | .................... A61B 5/4812 |
| 11,433,303 | B2 | 9/2022 | Shindo et al. | |
| 2017/0352179 | A1 | 12/2017 | Hardee et al. | |

FOREIGN PATENT DOCUMENTS

| | | |
|---|---|---|
| JP | 2020-044222 A | 3/2020 |
| WO | 2016/021236 A1 | 2/2016 |

OTHER PUBLICATIONS

International Search Report and Written Opinion mailed on Jan. 25, 2022, received for PCT Application PCT/JP2021/042186, filed on Nov. 17, 2021, 9 pages including English Translation.
Japanese Office Action issued May 12, 2025 in corresponding Japanese Patent Application No. 2024-138903, 8 pages.
Written Opinion of the International Searching Authority mailed on Jan. 25, 2022, received for PCT Application PCT/JP2021/042186, filed on Nov. 17, 2021, 3 pages. (Previously filed; submitting English translation only.).

* cited by examiner

*Primary Examiner* — David L Lewis
*Assistant Examiner* — Eric M Thomas
(74) *Attorney, Agent, or Firm* — XSENSUS LLP

(57) ABSTRACT

Provided is a program executed by a computer that includes a processor, wherein the program causes the processor to execute a step for acquiring daily sleep information from a user, a step for specifying a first parameter, which is a parameter to be used by the user to play a game, for each date by comparing sleep information of the user over a predetermined period with sleep information of the user for each date, and a step for advancing the game on each date by performing lottery processing using the first parameter corresponding to the date.

19 Claims, 6 Drawing Sheets

TERMINAL DEVICE (SMARTPHONE, TABLET)

121
FIRST WIRELESS COMMUNICATION UNIT (4G, 3G)

122
SECOND WIRELESS COMMUNICATION UNIT

190
CONTROL UNIT (PROCESSOR)

191
INPUT OPERATION RECEPTION UNIT

192
TRANSMISSION / RECEPTION UNIT

193
DATA PROCESSING UNIT

194
NOTIFICATION CONTROL UNIT

195
SCHEDULED WAKEUP TIME SETTING UNIT

130
OPERATION RECEPTION UNIT (TOUCH SCREEN)

131
TOUCH SENSITIVE DEVICE

132
DISPLAY

180
STORAGE UNIT (STORAGE, MEMORY)

181
USER INFORMATION

182
SLEEP INFORMATION

140
VOICE PROCESSING UNIT

141
MICROPHONE

142
SPEAKER

150
LOCATION INFORMATION SENSOR

170
MOTION SENSOR

160
CAMERA

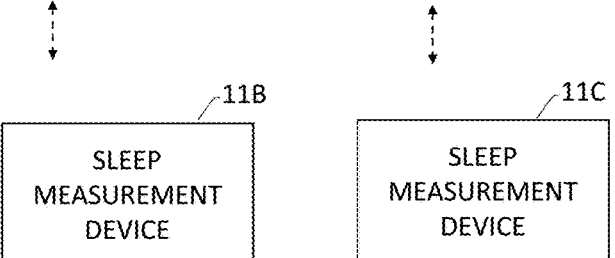

11B
SLEEP MEASUREMENT DEVICE

11C
SLEEP MEASUREMENT DEVICE

Figure 3:
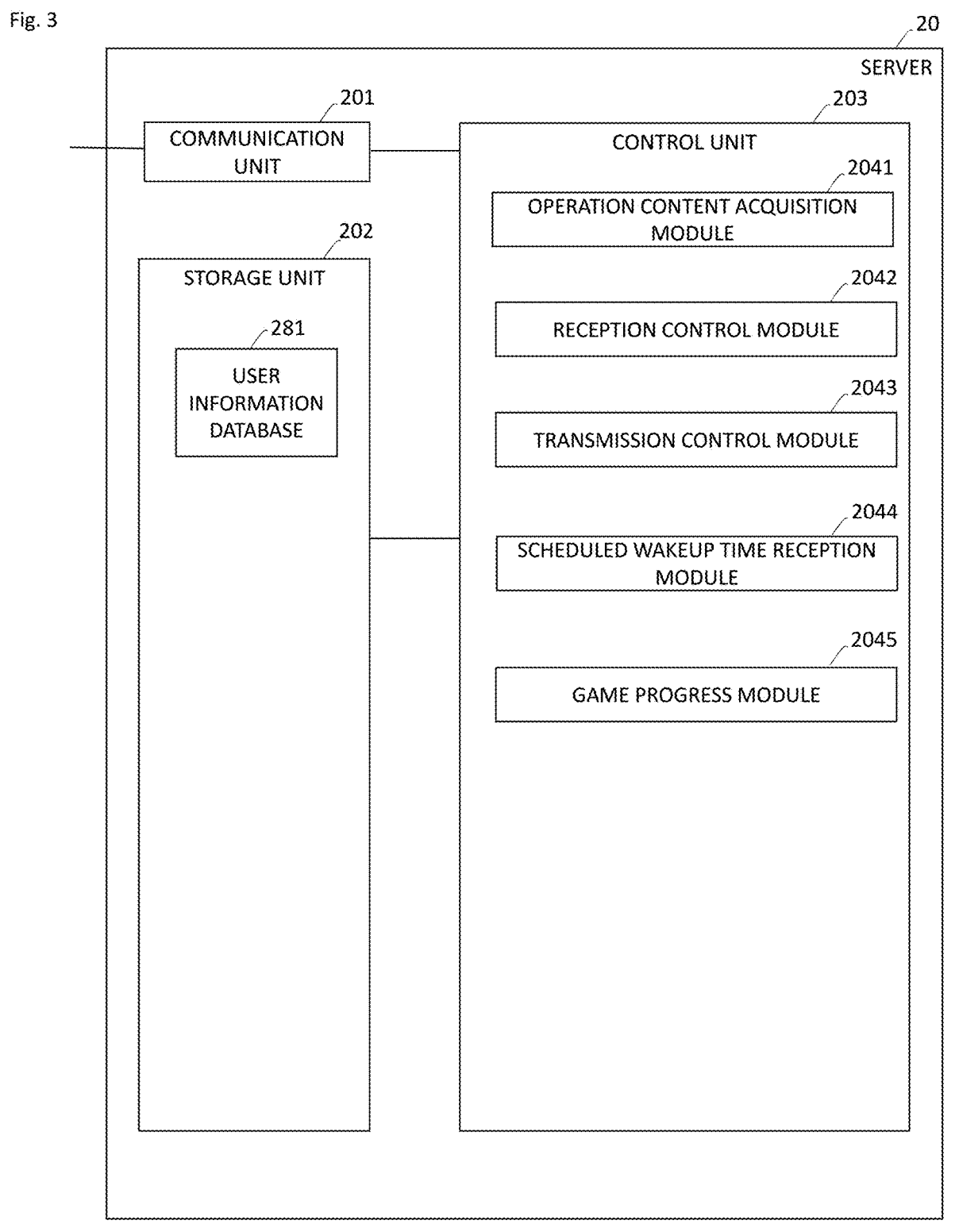

SERVER

201
COMMUNICATION UNIT

203
CONTROL UNIT

2041
OPERATION CONTENT ACQUISITION MODULE

2042
RECEPTION CONTROL MODULE

2043
TRANSMISSION CONTROL MODULE

2044
SCHEDULED WAKEUP TIME RECEPTION MODULE

2045
GAME PROGRESS MODULE

202
STORAGE UNIT

281
USER INFORMATION DATABASE

| STORAGE UNIT | | | | | | | | | | |
|---|---|---|---|---|---|---|---|---|---|---|

281

| USER INFORMATION DATABASE | | | | | | | | | | |
|---|---|---|---|---|---|---|---|---|---|---|
| USER ID | USER NAME | DATE | SCHEDULED WAKEUP TIME | WAKEUP TIME | FALLING ASLEEP TARGET | FALLING ASLEEP TIME | FALLING ASLEEP TARGET (PERIOD) | SLEEP COMPARISON PERIOD | TARGET DIFFICULTY | SLEEP TYPE |
| #1A2B3C | AZX123 | 31 MARCH 2020 | 7:00 | 7:00 | 22:00 | 23:50 | 26 MARCH 2020 TO 1 APRIL 2020 | 25 MARCH 2020 TO 31 MARCH 2020 | C | AA |
| | | 1 APRIL 2020 | 7:00 | 7:00 | — | 22:00 | 22:00-- 24:00 | 26 MARCH 2020 TO 1 APRIL 2020 | | BB |
| | | ... | ... | ... | ... | ... | ... | ... | ... | ... |
| #6D7E8F | KKLLMM | 22 APRIL 2020 | 7:00 | 7:00 | 22:30 | 22:50 | 15 APRIL 2020 TO 22 APRIL 2020 | 14 APRIL 2020 TO 22 APRIL 2020 | A | AB |
| | | 23 APRIL 2020 | 7:00 | 7:00 | 22:30 | 22:30 | 22:30 -23:00 | 15 APRIL 2020 TO 23 APRIL 2020 | | BB |
| | | ... | ... | ... | ... | ... | | ... | | ... |
| ... | ... | ... | ... | ... | ... | ... | ... | ... | | ... |

Fig. 5

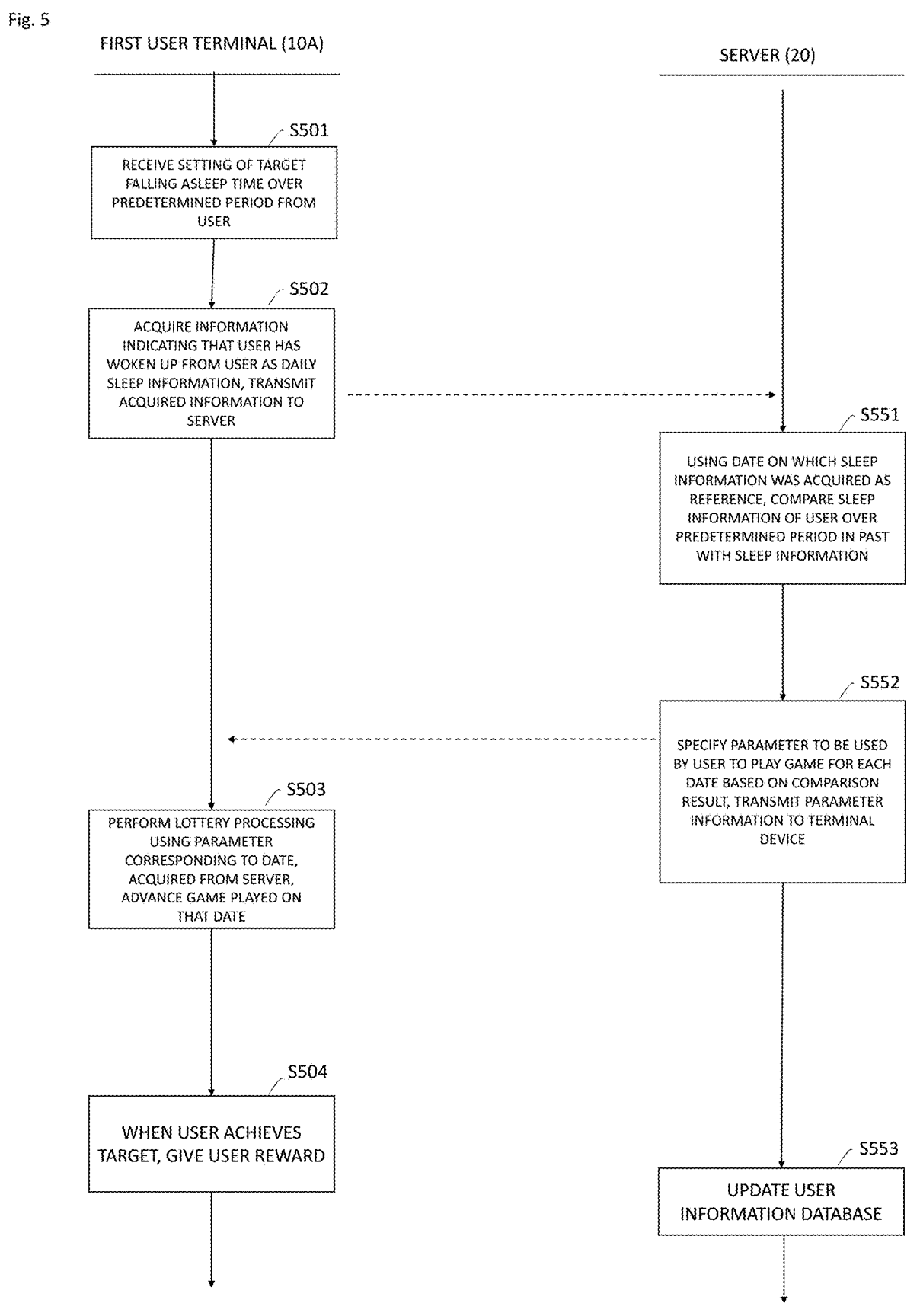

FIRST USER TERMINAL (10A)

SERVER (20)

S501

RECEIVE SETTING OF TARGET FALLING ASLEEP TIME OVER PREDETERMINED PERIOD FROM USER

S502

ACQUIRE INFORMATION INDICATING THAT USER HAS WOKEN UP FROM USER AS DAILY SLEEP INFORMATION, TRANSMIT ACQUIRED INFORMATION TO SERVER

S551

USING DATE ON WHICH SLEEP INFORMATION WAS ACQUIRED AS REFERENCE, COMPARE SLEEP INFORMATION OF USER OVER PREDETERMINED PERIOD IN PAST WITH SLEEP INFORMATION

S552

SPECIFY PARAMETER TO BE USED BY USER TO PLAY GAME FOR EACH DATE BASED ON COMPARISON RESULT, TRANSMIT PARAMETER INFORMATION TO TERMINAL DEVICE

S503

PERFORM LOTTERY PROCESSING USING PARAMETER CORRESPONDING TO DATE, ACQUIRED FROM SERVER, ADVANCE GAME PLAYED ON THAT DATE

S504

WHEN USER ACHIEVES TARGET, GIVE USER REWARD

S553

UPDATE USER INFORMATION DATABASE

Fig. 6

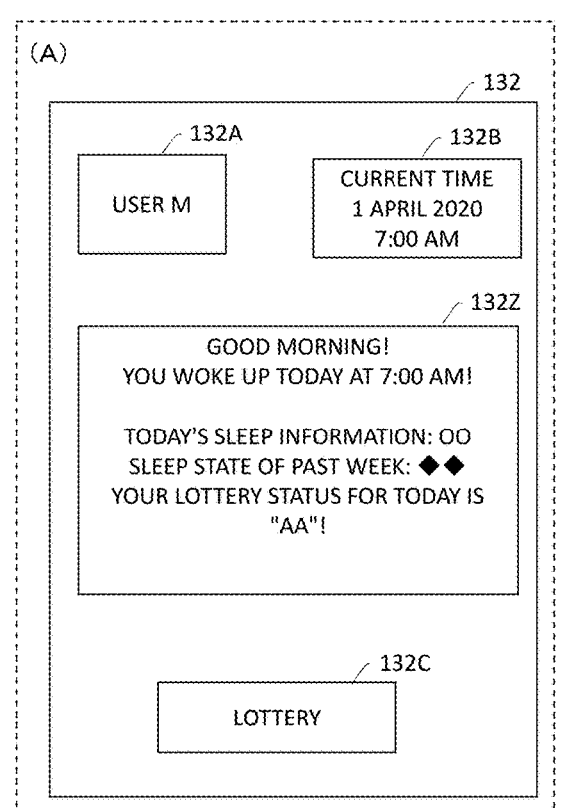

(A)

132

132A — USER M

132B
CURRENT TIME
1 APRIL 2020
7:00 AM

132Z
GOOD MORNING!
YOU WOKE UP TODAY AT 7:00 AM!

TODAY'S SLEEP INFORMATION: OO
SLEEP STATE OF PAST WEEK: ◆◆
YOUR LOTTERY STATUS FOR TODAY IS
"AA"!

132C
LOTTERY

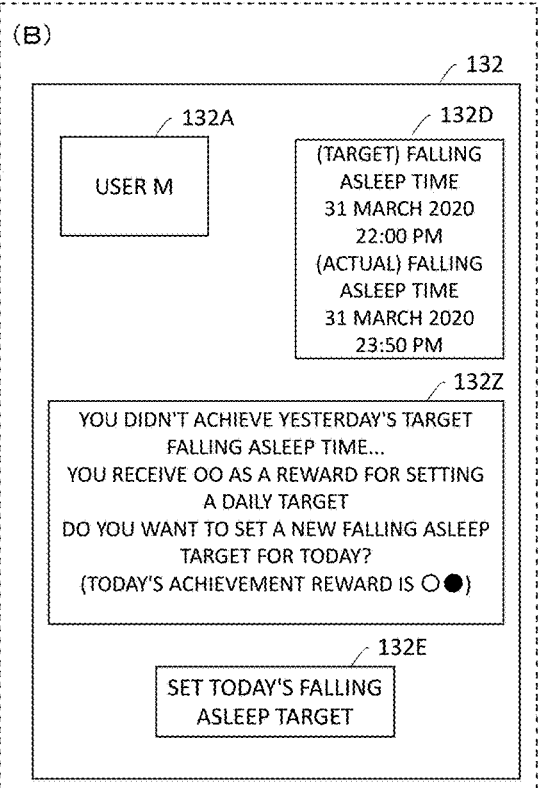

(B)

132

132A — USER M 132D
(TARGET) FALLING
ASLEEP TIME
31 MARCH 2020
22:00 PM
(ACTUAL) FALLING
ASLEEP TIME
31 MARCH 2020
23:50 PM

132Z
YOU DIDN'T ACHIEVE YESTERDAY'S TARGET
FALLING ASLEEP TIME...
YOU RECEIVE OO AS A REWARD FOR SETTING
A DAILY TARGET
DO YOU WANT TO SET A NEW FALLING ASLEEP
TARGET FOR TODAY?
(TODAY'S ACHIEVEMENT REWARD IS O●)

132E
SET TODAY'S FALLING
ASLEEP TARGET

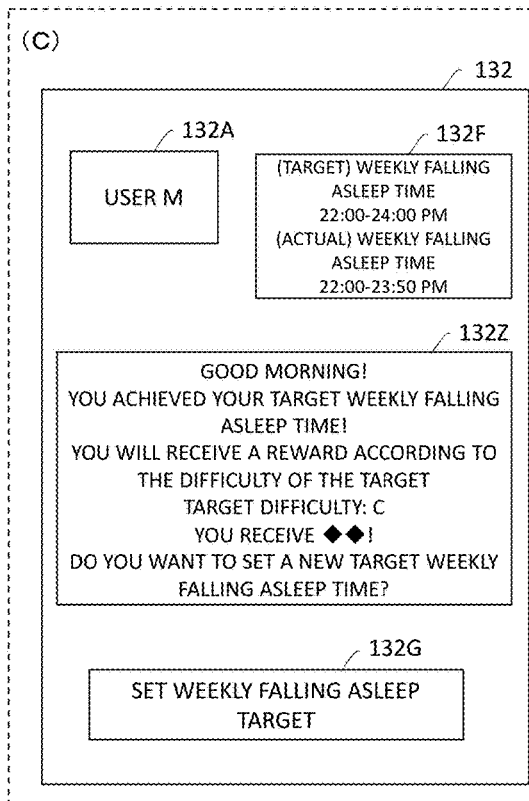

(C)

132

132A — USER M 132F
(TARGET) WEEKLY FALLING
ASLEEP TIME
22:00-24:00 PM
(ACTUAL) WEEKLY FALLING
ASLEEP TIME
22:00-23:50 PM

132Z
GOOD MORNING!
YOU ACHIEVED YOUR TARGET WEEKLY FALLING
ASLEEP TIME!
YOU WILL RECEIVE A REWARD ACCORDING TO
THE DIFFICULTY OF THE TARGET
TARGET DIFFICULTY: C
YOU RECEIVE ◆◆!
DO YOU WANT TO SET A NEW TARGET WEEKLY
FALLING ASLEEP TIME?

132G
SET WEEKLY FALLING ASLEEP
TARGET

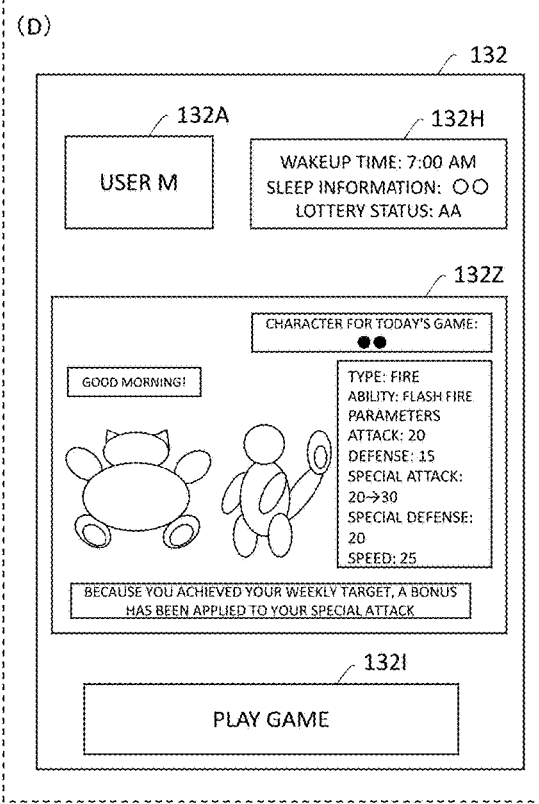

(D)

132

132A — USER M

132H
WAKEUP TIME: 7:00 AM
SLEEP INFORMATION: OO
LOTTERY STATUS: AA

132Z
CHARACTER FOR TODAY'S GAME:
●●

GOOD MORNING!

TYPE: FIRE
ABILITY: FLASH FIRE
PARAMETERS
ATTACK: 20
DEFENSE: 15
SPECIAL ATTACK:
20→30
SPECIAL DEFENSE:
20
SPEED: 25

BECAUSE YOU ACHIEVED YOUR WEEKLY TARGET, A BONUS
HAS BEEN APPLIED TO YOUR SPECIAL ATTACK

132I
PLAY GAME

PROGRAM, METHOD, AND INFORMATION PROCESSING DEVICE

CROSS-REFERENCE TO RELATED APPLICATIONS

This application is a continuation of International Application No. PCT/JP2021/042186, filed Nov. 17, 2021, which claims priority to JP 2020-198620, filed Nov. 30, 2020, the entire contents of each are incorporated herein by reference.

BACKGROUND

Field

The present disclosure relates to a game program, a method, and an information processing device.

Description of the Related Art

In a known technique, the progression of a game on a game application is controlled on the basis of health information about a user.

PTL 1 describes an information processing system for executing a game application, the information processing system including means for acquiring user information for calculating information relating to the sleep of a user, means for calculating health information relating to the sleep and/or the tiredness of the user on the basis of the acquired user information, and means for controlling the progression of a game on the game application on the basis of the health information.

CITATION LIST

Patent Literature

[PTL 1] WO 2016/021236

SUMMARY

Technical Problems

In a game that progresses in accordance with the health condition of the user, there is a need for a technique for making the game more enjoyable.

Solutions to Problems

According to an embodiment, a program executed by a computer that includes a processor is provided, wherein the program causes the processor to execute a step for acquiring daily sleep information from a user, a step for specifying a first parameter, which is a parameter to be used by the user to play a game, for each date by comparing sleep information of the user over a predetermined period with sleep information for each date, and a step for advancing the game on each date by performing lottery processing using the first parameter corresponding to the date.

[Advantages]

According to the present disclosure, a technique employed in a game that is advanced in accordance with the health condition of the user in order to make the game more enjoyable is provided.

BRIEF DESCRIPTION OF DRAWINGS

FIG. 2 is a block diagram of a terminal device 10 serving as a component of the system.

FIG. 3 is a diagram illustrating a functional configuration of a server.

FIG. 4 is a diagram illustrating a data structure of a user information database stored in the server.

FIG. 5 is a flowchart showing a series of processing for comparing information about the daily sleep of the user with information about the past sleep of the user and executing lottery processing in a game on the basis of the comparison result.

FIG. 6 illustrates example screens of the terminal device.

DETAILED DESCRIPTION

Figure 1:
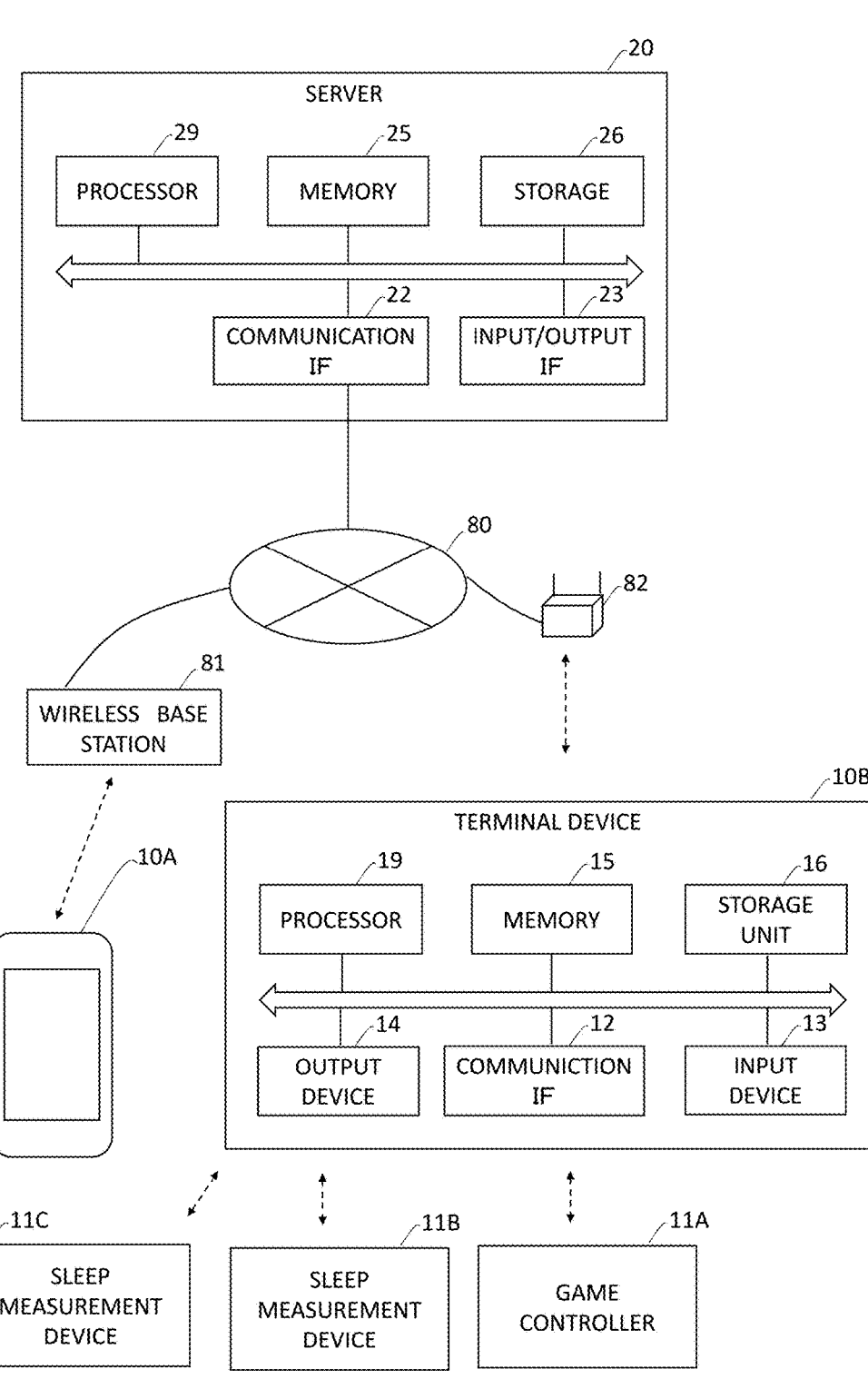
FIG. 1 is a diagram illustrating an overall configuration of a system.

Aspects of the present disclosure will be described below with reference to the drawings. In the following description, identical components have been allocated identical reference signs. The names and functions thereof are also identical. Accordingly, detailed description thereof will not be repeated.

First Embodiment

<1 Diagram showing overall configuration of system>

FIG. 1 is a diagram illustrating an overall configuration of a system 1. In the system 1, a server advances a game upon reception of sleep information about each user.

As illustrated in FIG. 1, the system 1 includes a plurality of terminal devices (a terminal device 10A and a terminal device 10B are illustrated in FIG. 1; hereinafter the terminal devices may be collectively referred to as the "terminal device 10") and a server 20. The terminal device 10 and the server 20 are connected so as to communicate with each other via a network 80. Further, in this embodiment, the devices (the terminal devices, the server, and so on) can also be perceived as an information processing device. In other words, an aggregation of such devices can be perceived as one "information processing device", and the system 1 may be formed as an aggregation of a plurality of devices. A method for distributing a plurality of functions required for realizing the system 1 according to the present embodiment to one or a plurality of pieces of hardware can be appropriately determined in consideration of the processing capacity of each piece of hardware and/or the specifications required of the system 1 and so on.

The terminal device 10 is a device operated by a user. The terminal device 10 is realized by a mobile terminal such as a smartphone or a tablet, which is compatible with a mobile communication system. Alternatively, the terminal device 10 may, for example, be a stationary-type personal computer (PC), a laptop PC, or a game console. In addition, the terminal device 10 may be configured to function as a head mounted display and, for example, may be configured to function as a head mounted display of a transmissive type, a non-transmissive type, or a see-through type. For example, the terminal device 10 may be configured to function as a portable terminal in the case of not functioning as a head mounted display and function as a head mounted display by being mounted in a goggle-type device. In such a case, the terminal device 10 can perform switching between a mode in which the terminal device functions as a portable terminal and a mode in which the terminal device functions as a head mounted display. In the case of the mode in which the terminal device functions as a head mounted display, the terminal device 10 detects a movement of a user's head part using a movement sensor built in the terminal device 10 and updates a displayed image of the display in accordance with a movement of the user's head part.

As represented as the terminal device 10B in FIG. 1, the terminal device 10 includes a communication interface (IF) 12, an input device 13, an output device 14, a memory 15, a storage unit 16, and a processor 19. The server 20 includes a communication IF 22, an input/output IF 23, a memory 25, storage 26, and a processor 29.

The terminal device 10 is communicably connected to the server 20 via the network 80. The terminal device 10 is connected to the network 80 by communicating with a communication device such as a wireless base station 81 compliant with a communication standard such as 5G, Long Term Evolution (LTE), or the like, or a wireless LAN router 82 compliant with a wireless local area network (LAN) standard such as Institute of Electrical and Electronics Engineers (IEEE) 802.11 or the like.

The communication IF 12 is an interface that inputs and outputs signals to allow the terminal device 10 to communicate with an external device. The input device 13 is an input device (for example, a touch panel, a touch pad, a pointing device such as a mouse, a keyboard, or the like) for receiving input operations from a user. The output device 14 is an output device (a display, a speaker, or the like) for presenting information to the user. The memory 15 is a volatile memory such as a Dynamic Random Access Memory (DRAM), for example, and is used to temporarily store programs, data processed by the programs, and so on. The storage unit 16 is a storage device for storing data, such as a flash memory or a Hard Disc Drive (HDD), for example. The processor 19 is hardware used for executing a command set described in a program and is constituted by an arithmetic operation device, a register, a peripheral circuit, and the like.

As illustrated, the terminal device 10 is connected to a game controller 11A either by wire or wirelessly. The user can play a game by operating the game controller 11A. The terminal device 10 may be configured to be capable of communicating with a plurality of game controllers 11A. For example, a plurality of users can play a game using a single terminal device 10. Further, the game controller 11A may be structured so as to be attachable to and detachable from the terminal device 10. The game controller 11A may be constituted by a single device that the user can grip using both hands or two devices that can be gripped by the respective hands of the user. For example, the game controller 11A may include a gyro sensor, an infrared sensor, or the like in order to detect movements (for example, hand movements) of the body of the user while the user grips the game controller 11A.

In addition, as illustrated, the terminal device 10 is connected to one or a plurality of sleep measuring devices in a wired manner or a wireless manner. Sleep measuring devices 11B and 11C are devices used for acquiring information about the sleep of the user of the terminal device 10. FIG. 1 illustrates two sleep measuring devices including the sleep measuring device 11B and the sleep measuring device 11C. Hereinafter, a plurality of sleep measuring devices may be collectively referred to as "the sleep measuring device 11B and so on." The sleep measuring devices 11B and 11C, for example, are wearable devices of a wrist watch type, a ring type, an eye-mask type, or the like worn by a user and include motion sensors such as gyro sensors or the like.

Alternatively, or additionally, the sleep measuring devices 11B and 11C may be devices that are placed in a mattress on which a user is sleeping, a headboard, or the like.

Furthermore, the terminal device 10 and the sleep measuring device 11B or the sleep measuring device 11C may be the same device. In other words, the terminal device 10 may be configured to function also as a sleep measuring device.

There may be cases in which a user uses two or more sleep measuring devices at the same time. For example, a user may wear two sleep measuring devices of a wrist watch type or may use a smartphone as a sleep measuring device while wearing a sleep measuring device of a wrist watch type. This makes it possible to detect a motion of the body of the user during sleep by using a gyro sensor or the like. By accumulating sensing results that have been sensed using various sensors during sleep of a user, it can be identified whether the user is during sleep, in a light sleep state, a deep sleep state, a REM sleep, a non-REM sleep, or the like. In this way, by identifying the waveform of a REM sleep or a non-REM sleep and the like, the quality of sleep of a user can be evaluated. For example, cycles of a REM sleep and a non-REM sleep in the case of a sleep of a good quality are set in advance, and the quality of a sleep of a user can be evaluated by comparing the waveform thereof with the waveforms of the REM sleep and the non-REM sleep at the time of the user sleeping.

The terminal device 10 detects that a user has gotten into bed (for example, is lying down horizontally on a bed) and has fallen asleep after getting into bed based on an output of a motion sensor of the sleep measuring device 11B and the like. The terminal device 10 can determine whether a user had performed an input operation on the terminal device 10, whether a user had viewed information displayed on a display 132 of the terminal device 10, and the like before the user fell asleep after getting into bed. In other words, it can be determined whether or not a user going to go to bed has operated the terminal device 10 before falling asleep.

Furthermore, the sleep measuring devices envisaged in advance as being used by the system 1 are managed in the form of a so-called white list. Note that when data reception is detected from the sleep measuring device 11B that is not managed by the system 1, either measures may be taken to ensure that sleep information is not received from the sleep measuring device 11B from which the server 20 cannot be identified, or subsequent processing may be executed using parameters used for the unidentifiable sleep measuring device 11B or the like.

Differences in types of sleep measuring devices do not necessarily need to be different devices. In other words, even sleep measuring devices of the same device configuration may be managed in the system 1 as different sleep measuring devices in accordance with the types of software and applications used before transmitting sleep information to the server 20. For example, when sleep information is detected using the same sleep measuring device 11B, the sleep measuring device can be managed using different "sleep measuring device IDs" in a case where a sleep measuring application A is used for processing the sleep information and a case where a sleep measuring application B that differs from the sleep measuring application A is used for processing the sleep information. In this way, by managing the sleep measuring device using different "sleep measuring device IDs" in accordance with a combination of the type of device used as the device configuration and the used application, sleep information can be generated more flexibly, and as a result, enjoyment of a game according to a sleep state can be sufficiently exhibited.

The server 20 manages the information of each user. As the user information, the server 20 manages game characters and game items held by the user, an amount of virtual currency held by the user (including currency given to the user free of charge and currency given to the user for a fee), information set by the user in relation to a sleep target over a predetermined period, sleep information on the user measured by the sleep measuring device, and so on.

The communication IF 22 is an interface that inputs and outputs signals to allow the server 20 to communicate with an external device. The input/output IF 23 functions as an interface between an input device for receiving input operations from the user and an output device for presenting information to the user. The memory 25 is a volatile memory such as a Dynamic Random Access Memory (DRAM), for example, and is used to temporarily store programs, data processed by the programs, and so on. The storage 26 is a storage device for storing data, such as a flash memory or a Hard Disc Drive (HDD), for example. The processor 29 is hardware used for executing a command set described in a program and is constituted by an arithmetic operation device, a register, a peripheral circuit, and the like.

<1.1 Configuration of Terminal Device 10>

FIG. 2 is a block diagram of the terminal device 10 serving as a component of the system 1 according to a first embodiment. As illustrated in FIG. 2, the terminal device 10 includes a plurality of antennae (an antenna 111 and an antenna 112), wireless communication units (a first wireless communication unit 121 and a second wireless communication unit 122) respectively corresponding to the antennae, an operation reception unit 130 (including a touch sensitive device 131 and a display 132), a voice processing unit 140, a microphone 141, a speaker 142, a location information sensor 150, a camera 160, a motion sensor 170, a storage unit 180, and a control unit 190. The terminal device 10 also includes functions and configurations not specifically illustrated in FIG. 2 (for example, a battery for storing power, a power supply circuit for controlling the supply of power from the battery to respective circuits, and so on). As illustrated in FIG. 2, the respective blocks included in the terminal device 10 are electrically connected by a bus or the like.

The antenna 111 radiates a signal generated by the terminal device 10 as radio waves. Further, the antenna 111 receives radio waves from a space and provides a received signal to the first wireless communication unit 121.

The antenna 112 radiates a signal generated by the terminal device 10 as radio waves. Further, the antenna 112 receives radio waves from a space and provides a received signal to the second wireless communication unit 122.

The first wireless communication unit 121 performs modulation and demodulation processing for transmitting and receiving signals via the antenna 111 to enable the terminal device 10 to communicate with other wireless devices. The second wireless communication unit 122 performs modulation and demodulation processing for transmitting and receiving signals via the antenna 112 to enable the terminal device 10 to communicate with other wireless devices. The first wireless communication unit 121 and the second wireless communication unit 122 are communication modules including a tuner, a received signal strength indicator (RSSI) calculation circuit, a cyclic redundancy check (CRC) calculation circuit, a high frequency circuit, and the like. The first wireless communication unit 121 and the second wireless communication unit 122 perform modulation, demodulation, and frequency conversion on wireless signals transmitted and received by the terminal device 10, and provide the received signals to the control unit 190.

The operation reception unit 130 has a mechanism for receiving an input operation from the user. Specifically, the operation reception unit 130 is configured as a touch screen, and includes the touch sensitive device 131 and the display 132. The touch sensitive device 131 receives an input operation from the user of the terminal device 10. The touch sensitive device 131 uses the capacitive touch panel, for example, to detect a contact position of the user on a capacitive touch panel. The touch sensitive device 131 outputs a signal indicating the contact position of the user detected by the touch panel to the control unit 190 as an input operation.

The display 132 displays data such as an image, a moving image, and text under the control of the control unit 190. The display 132 is realized as, for example, a liquid crystal display (LCD) or an organic electro-luminescence (EL) display.

The voice processing unit 140 performs modulation and demodulation on a voice signal. The voice processing unit 140 modulates a signal provided from the microphone 141, and provides the resulting modulated signal to the control unit 190. The voice processing unit 140 also provides the voice signal to the speaker 142. The voice processing unit 140 is realized by a processor used for voice processing, for example. The microphone 141 receives voice input and provides a voice signal corresponding to the voice input to the voice processing unit 140. The speaker 142 converts the voice signal provided from the voice processing unit 140 into a voice and outputs the voice to the outside of the terminal device 10.

The location information sensor 150 is a sensor that detects the location of the terminal device 10, and is, for example, a global positioning system (GPS) module. The GPS module is a reception device that is used in a satellite positioning system. The satellite positioning system receives signals from at least three or four satellites, and detects a current position of the terminal device 10 having the GPS module mounted thereon, on the basis of the received signals. For example, in a case where the system 1 is configured to be able to refer to locations of users who are registered as friends, the terminal device 10 can display a list of friends present near the user on the display 132.

The camera 160 is a device for receiving light using a light reception element and outputting the light as a captured image. The camera 160 is, for example, a depth camera capable of detecting a distance from the camera 160 to an object to be captured.

The motion sensor 170 includes an acceleration sensor, an angular velocity sensor, and the like, detects a movement of the terminal device 10, and outputs a sensing result. For example, by placing the terminal device 10 in a mattress of a bed on which a user sleeps or the like, in a case in which a user during sleep is moving on the mattress, the corresponding motion can be detected. By using the sensing result, it can be identified whether a user is sleeping or is awoken, and whether the user during sleep is in a light sleep, a deep sleep, a REM sleep, or a non-REM sleep, and the like.

The storage unit 180 is configured of, for example, a flash memory, and stores data and programs to be used by the terminal device 10. In a certain phase, the storage unit 180 stores user information 181.

The user information 181 is information on each user in a game based on a game program. The information on the user includes information for identifying the user, the name of the user, game items held by the user, information set by the user in relation to a sleep target over a predetermined period, sleep information on the user measured by the sleep measuring device 11B or the like, and so on.

The terminal device 10 receives sensing results of the sleep measuring device 11B and the like by communicating with the sleep measuring device 11B and the like using short-range radio communication such as Bluetooth (a registered trademark), Wi-Fi, or the like. The sleep measuring device 11B and the like may transmit sensing results to the server 20 without using short-range radio communication in correspondence with communication standards of a mobile communication system such as 5G. The terminal device 10 may receive sensing results acquired by the sleep measuring device 11B and the like from the server 20 that has received the sensing results from the sleep measuring device 11B and the like, generate sleep information using the received sensing results, and store the generated sleep information.

The control unit 190 controls the operation of the terminal device 10 by reading the program stored in the storage unit 180 and executing instructions included in the program. The control unit 190 is, for example, an application processor. The control unit 190 operates in accordance with a program so as to exhibit the functions of an input operation reception unit 191, a transmission/reception unit 192, a data processing unit 193, a notification control unit 194, and a scheduled wakeup time setting unit 195.

The input operation reception unit 191 performs processing of receiving an input operation from the user on an input device such as the touch sensitive device 131. The input operation reception unit 191 determines the type of the operation, such as whether the operation of the user is a flick operation, a tap operation, a drag (swipe) operation, or the like on the basis of information of coordinates at which the user touches the touch sensitive device 131 with a finger or the like.

The transmission/reception unit 192 performs processing for enabling the terminal device 10 to transmit/receive data to/from external devices such as the server 20, the game controller 11A, the sleep measuring device 11B, and the like in accordance with a communication protocol.

The data processing unit 193 performs a calculation on data received by the terminal device 10 according to a program, and performs processing for outputting a calculation result to a memory or the like.

The notification control unit 194 performs processing of presenting information to the user. The notification control unit 194 performs processing of causing the display 132 to display a display image, processing of causing the speaker 142 to output a voice, processing of causing the camera 160 to generate vibration, and the like.

The scheduled wakeup time setting unit 195 receives an operation from the user for setting a scheduled wakeup time for the day in question on which the game is to be advanced. For example, the scheduled wakeup time setting unit is an alarm setting unit, and the user sets an activation time of the alarm as the scheduled wake-up time. At the scheduled wakeup time, the terminal device 10 sounds the alarm, and when the user stops the alarm, the terminal device 10 determines that the user has woken up and generates sleep information to be transmitted to the server 20. After receiving the sleep information from the terminal device 10, the server 20 compares the information relating to the sleep target over the predetermined period, received from the user in advance, with the sleep information of the day in question, and advances the game on the basis of the comparison result.

The alarm setting unit referred to here may be realized by the program through which the respective devices (the terminal device 10 and the server 20) constituting the system 1 provide the user with the game. When the alarm setting unit is realized by a program that operates in the server 20, the user can operate the alarm setting unit of the server 20 through the terminal device 10. Thus, the user sets the scheduled wakeup time and advances the game within the system 1. Alternatively, for example, the alarm setting unit may be installed in the terminal device 10 and incorporated into an application that can be linked to the system 1. In this case, the user can set the scheduled wakeup time using an alarm setting unit serving as a component of an application for providing the user with the game realized by the system 1 in the terminal device 10, rather than an alarm function provided as a function of the Operating System (OS) of the terminal device 10. The system 1 advances the game upon receipt of an operation relating to the scheduled wakeup time from the alarm setting unit.

<1.2 Functional Configuration of Server 20>

FIG. 3 is a diagram illustrating a functional configuration of the server 20. As illustrated in FIG. 3, the server 20 exhibits the functions of a communication unit 201, a storage unit 202, and a control unit 203.

The communication unit 201 performs processing for enabling the server 20 to communicate with an external device.

The storage unit 202 stores data and programs used by the server 20. The storage unit 202 stores a user information database 281, server processing capacity information 282, and the like.

The user information database 281 is a database used for storing information of each user in a game based on a game program. Details thereof will be described below.

The control unit 203 exhibits functions represented as various modules by the processor of the server 20 performing processing according to a program.

The operation content acquisition module 2041 acquires operation content of the user. The operation content acquisition module 2041 acquires, as the operation content of the user, the period specified by the user as the sleep target over the predetermined period and so on, for example.

The reception control module 2042 controls processing for the server 20 to receive a signal from an external device in accordance with a communication protocol.

The transmission control module 2043 controls processing for the server 20 to transmit a signal to an external device in accordance with a communication protocol.

A scheduled wakeup time reception module 2044 receives from the terminal device 10 information relating to the scheduled wakeup time of the day in question on which the game is to be advanced, the scheduled wakeup time having been set by the user. For example, it is assumed that the user has set an activation time of the alarm as the scheduled wakeup time. The terminal device 10 activates the alarm on the basis of the alarm activation time, receives operation input from the user, and transmits sleep information on the user, which is specified from the wakeup time of the user, to the server 20 in response to the operation input. The server 20 advances the game on the basis of a comparison result between the sleep information and the information received in advance from the user in relation to the sleep target over the predetermined period. In other words, the server 20 receives information for advancing the game from the terminal device 10 of each user on the basis of operation input received from each user at the alarm activation time set by each user.

The operation input referred to here is an operation for confirming wakeup time information, for example, an operation performed by the user to terminate sleep measurement after waking up. The operation input may be an operation for stopping the ringing alarm or an operation for terminating sleep measurement after waking up before the alarm rings. When the operation input is not received before the scheduled wakeup time arrives, the alarm is sounded at the scheduled wakeup time. Further, when the terminal device 10 receives the operation input before the scheduled wakeup time arrives, the terminal device 10 terminates sleep measurement without sounding the alarm at the scheduled wakeup time.

Furthermore, the wakeup time information referred to here is chronological information, for example, sleep information on the user. The terminal device 10 confirms the sleep information by receiving operation input from the user for terminating sleep measurement after waking up. The terminal device 10 then transmits to the server 20 the result of a comparison between the confirmed sleep information and the information received in advance from the user in relation to the sleep target over the predetermined period. The server 20 specifies a sleep status of each user for the day in question on the basis of the acquired result, specifies an object or the like by lottery processing on the basis of the specified result, and gives the user the specified object.

A game progress module 2045 implements communication between the server 20 and the terminal device 10 in order to advance the game being played by each user on the basis of a comparison result between the sleep information of each user for the day in question, which is received from the terminal device 10 of each user, and sleep information over a predetermined period in the past. For example, the game progress module 2046 advances the game being played by the user by randomly determining, by lottery, a game object such as a character or an item that is to appear in the game. The determined characters, items, and so on may be owned by the users or may simply appear in the game being played rather than being owned by the users. This makes it possible for the users to have experiences such as discovering new game characters on the basis of their own sleep information. Alternatively, the game progress module 2046 may randomly draw a game object such as a character or an item by lottery and give the randomly drawn game object to the user. For example, the game progress module 2046 receives information about the sleep time or information about the sleep quality from the terminal device 10 as the sleep information of the user, and compares this information with sleep information about the user over a predetermined period in the past. The game progress module 2046 then specifies an object or the like by lottery processing on the basis of the result of the comparison of this information, and gives the user the object. Here, examples of the lottery processing will be given. The lottery processing may be at least one of lottery processing for determining the characters that are to appear in the game, lottery processing for determining the likelihood of a specific character appearing in the game, and lottery processing for correcting parameters stored in association with the user.

<2 Data Structures>

FIG. 4 is a diagram illustrating a data structure of a user information database 281 stored in the server 20.

As shown in FIG. 4, each record in the user information database 281 includes a "user ID" item, a "user name" item, a "date" item, a "scheduled wakeup time" item, a "wakeup time" item, a "falling asleep time" item, a "falling asleep target" item, a "falling asleep target (period)" item, a "sleep comparison period" item, a "target difficulty" item, a "sleep type" item, and so on.

The "user ID" item is information for identifying each user.

The "user name" item is a name set by the user.

The "date" item is information relating to the date on which the user plays the game.

The "scheduled wakeup time" item is information set by the user in relation to a scheduled time to wake up on each date. For example, the scheduled wakeup time is the alarm activation time set by the user. For example, the scheduled wakeup time set by a user with the user ID "#1A2B3C" and the user name "AZX123" on the date "31 Mar. 2020" is shown to be "7:00".

The "wakeup time" item is information relating to the time at which the user actually woke up on each date. More specifically, this information denotes the time at which the user operated the terminal device 10 so as to terminate sleep measurement. The operation performed by the user may be, for example, an operation for stopping the ringing alarm or an operation for terminating sleep measurement after waking up before the alarm rings. In this case, the server 20 may specify information relating to a difference between the scheduled wakeup time and the actual wakeup time and present the user with a specific reward or the like on the basis of the specified information. For example, the wakeup time of the user with the user ID "#1A2B3C" and the user name "AZX123" on the date "31 Mar. 2020" is shown to be "7:00".

The "falling asleep target" item is information relating to a target time to fall asleep, which is set by the user for each date. For example, this information indicates a target time to fall asleep, which is set by the user by operating the terminal device 10 before falling asleep the day before (while active after waking up or the like). For example, the falling asleep target set by the user with the user ID "#1A2B3C" and the user name "AZX123" on the date "31 Mar. 2020" is shown to be "22:00". This target setting may be received from the user every day, or there may be days on which a target setting is not received from the user. For example, the falling asleep target set by the user with the user ID "#1A2B3C" and the user name "AZX123" on the date "1 Apr. 2020" is shown to be "-", or in other words, a falling asleep target has not been set. Thus, the users can decide whether or not to set a target of their own free will, thereby eliminating obsessive thoughts about target setting, and as a result, the game can be advanced more freely, making the game more enjoyable. Moreover, negative effects on sleep habits caused by obsessive thoughts about compulsive target setting can be prevented.

The "falling asleep time" item is information relating to the time at which the user actually fell asleep on each date. More specifically, the information relates to the time at which the user fell asleep, as detected by the terminal device 10 or the sleep measurement device 11B or the like. For example, the time at which the user with the user ID "#1A2B3C" and the user name "AZX123" fell asleep on the date "31 Mar. 2020" is shown to be "23:50". The server 20 may specify information relating to the sleep of the user (the sleep time, tendencies such as being a long sleeper or a short sleeper, and so on) on the basis of the information indicating the wakeup time and the information indicating the fall asleep time.

The "falling asleep target (period)" item is information relating to a time at which to fall asleep over a predetermined period, set by the user. More specifically, this information indicates a range of target falling asleep times over a predetermined period, for example a unit of one week or the like, which is set by the user by operating the terminal device 10. In this case, the target falling asleep range may be any range specified by the user. In other words, the target falling asleep range may be a unit extending over a long period, such as one week or one month, or a unit of several days. Moreover, the user can specify whether to set the target or not as desired. For example, the falling asleep target (period) of the user with the user ID "#1A2B3C" and the user name "AZX123" up to the date "1 Apr. 2020" is shown to be "Mar. 26 2020 to 1 Apr. 2020, 22:00-24:00".

The "sleep comparison period" item is information relating to a period of past sleep information about the user, which is compared with the sleep information of the day in question in order to specify the sleep type of the user. More specifically, this information indicates a period in which past sleep information about the user was acquired, the past sleep information being compared with the sleep information of the user on the day in question when the server 20 acquires the sleep information of the day in question. For example, the sleep comparison period of the user with the user ID "#1A2B3C" and the user name "AZX123" on the date "31 Mar. 2020" is shown to be "25 Mar. 2020 to 31 Mar. 2020". Further, the sleep comparison period of the same user with the user ID #1A2B3C" and the user name "AZX123" on the date "1 Apr. 2020" is shown to be "26 Mar. 2020 to 1 Apr. 2020". Note that in certain aspects, the server 20 may acquire this information by acquiring sleep information over a period specified by the user by operating the terminal device 10.

The "target difficulty" item is information indicating the difficulty of achieving the aforementioned "falling asleep target (period)" item. More specifically, this information indicates the difficulty of achieving the target, which is specified by the server 20 on the basis of the target falling asleep range over the predetermined period, received from the user. In this case, the server 20 may specify the difficulty on the basis of information such as the set time range, the set period length, and the set time slot of the falling asleep target received from the user. For example, the falling asleep target (period) of the user with the user ID "#1A2B3C" and the user name "AZX123" up to the date "1 Apr. 2020" is "26 Mar. 2020 to 1 Apr. 2020 22:00-24:00", and the target difficulty is shown to be "C". In certain aspects, the server 20 may specify information on a reward to be presented to the user on the basis of the difficulty when the user achieves the falling asleep target.

The "sleep type" item is information indicating the sleep type of the user on each date. More specifically, the server 20 compares the sleep information of the user on each date with the sleep information of the user over a predetermined period in the past (a sleep comparison period) based on each date. Next, the server 20 specifies the sleep type of the user on each date on the basis of the comparison result. In certain aspects, the sleep type may be represented by an object such as a specific character as well as being displayed in words. Thus, the server 20 can advance the game being played by the user on the basis of the sleep information for each date. Here, even if similar sleep information is detected on two consecutive days, for example, since the comparison period is different, different sleep types may be specified. Therefore, even if similar sleep information is detected consecutively, the user can advance the game on the basis of different sleep types, and as a result, the user can continue to play the game without forcibly breaking their sleep rhythm in order to vary the game play.

Thus, in comparison with a case where the parameters used in the game are set randomly, the user can sense that their own daily sleep information is being used in the game play. Moreover, even when the user lives a regular everyday life, the comparison period of the sleep information is different, and therefore the likelihood that the game will be played under completely identical sleep parameters is low. As a result, the game play becomes more enjoyable, allowing the user to continue to play the game without becoming bored. In addition, the sleep information changes according to a large number of external factors and psychological factors. The user can advance the game play on the basis of the daily sleep information without being forced to sleep. Hence, the user can continue to play the game without suffering obsessive thoughts, such as "I must sleep for the sake of my sleep parameters", and stress.

<Operation>

FIG. 5 is a flowchart showing a series of processing for comparing the daily sleep information of the user with past sleep information of the user, and executing lottery processing in the game on the basis of the comparison result. The terminal device 10 communicates with the server 20 in order to transmit the daily sleep information of the user to the server 20, and reflects parameters based on the result of a comparison between the daily sleep information and sleep information over a predetermined period in the past in the game.

In step S501, the terminal device 10 receives a setting of a target falling asleep time over a predetermined period from the user. In certain aspects, this target does not have to be set, and instead, the terminal device 10 may first receive a specification from the user indicating whether or not a target is to be set. The terminal device 10 receives the setting of a target falling asleep time over a predetermined period from the user only when the target has been set.

Thus, the user can decide whether or not to set a target falling asleep time of their own free will, thereby eliminating obsessive thoughts about being forced to play the game, and as a result, it can be expected that the user will stay motivated to continue playing the game.

In step S502, the terminal device 10 acquires information indicating that the user has woken up from the user as the daily sleep information, and transmits the acquired information to the server 20. For example, the user sets a scheduled wakeup time (an alarm activation time) and stops the operation of the alarm in response to activation of the alarm at the scheduled wakeup time. Next, the terminal device 10 specifies the sleep information on each date by terminating measurement of the sleep information of the user, and transmits the specified information to the server 20.

In step S551, using the date on which the server 20 acquired the sleep information of the user from the terminal device 10 as a reference, the server 20 compares the sleep information of the user over a predetermined period in the past with the sleep information of this date. For example, using the date on which the sleep information was acquired as a reference, the server 20 compares the sleep information of the user over a predetermined period of one week in the past, for example, with the sleep information of this date.

In step S552, the server 20 specifies the parameters to be used in the game being played by the user for each date on the basis of the comparison result, and transmits information on the parameters to the terminal device 10.

Thus, the user can specify information on the parameters to be used in the game the user is playing by means of comparison with their own past sleep information rather than specifying the information by means of comparison with average sleep information of other users. Hence, the user can play the game under conditions in which the information on the parameters used to play the game is different day by day, and as a result, it can be expected that the game will become more enjoyable.

In step S503, the terminal device 10 advances the game on the date in question by performing lottery processing using the parameters corresponding to the date, acquired from the server. Here, the lottery processing may be at least one of lottery processing for determining the characters that are to appear in the game, lottery processing for determining the likelihood of a specific character appearing in the game, and lottery processing for correcting parameters stored in association with the user (a parameter for raising or lowering character parameters, a parameter representing the degree of a so-called buff effect or the like, a parameter for increasing or reducing rewards (for example, an item acquired as a reward after completing a quest or the like) given to the user as a reward for advancing the game, and so on).

In step S504, the terminal device 10 gives the user a reward when the user achieves the target. In certain aspects, the target may be a target for a single day, a target over a predetermined period, and so on. For example, the terminal device 10 may receive from the user both a setting of a target falling asleep time for each day and a setting of a target falling asleep time over a predetermined period. The server 20 stores the target received from the terminal device 10, and having acquired information indicating that the user has woken up on each date, refers to the target information in order to specify whether or not the target has been achieved. The terminal device 10 may then give the user a reward on the basis of the specification result received from the server 20. In certain aspects, a difficulty level or the like may be set as the target. The terminal device 10 may vary the reward given to the user in accordance with the difficulty level.

Thus, the user can consider the target falling asleep time that should be set in order to achieve the target, and as a result, an improvement in lifestyle habits can be expected. Moreover, by varying the reward according to the difficulty of the target and so on, it can be expected that the game will become more enjoyable.

In step S553, the server 20 updates the user information database.

By means of the series of processing described above, in a game that is advanced by information relating to the sleep of each user, the game can be advanced using parameters specified by means of comparison with the user's own past information rather than comparison with other users, and as a result, the game can be made more enjoyable.

4 Example Screens

FIG. 6 is a diagram illustrating example screens of the terminal device 10.

Example screen (A) in FIG. 6 is a diagram showing an aspect in which the parameters for advancing the game are determined and presented to the user from the sleep information of the day in question, which is based on the time that the user woke up, and the sleep information over a predetermined period in the past.

As illustrated on example screen (A), the terminal device 10 displays a user name display section 132A, a current time display section 132B, a lottery execution button 132C, and a notification display section 132Z on the display 132.

The user name display section 132A is an area for displaying the user name of the corresponding user.

The current time display section 132B is an area for presenting the time at which each example screen is displayed. On example screen (A), the user has set an alarm activation time as the wakeup time before falling asleep, and the current time is the time at which the user woke up in response to activation of the alarm.

The notification display section 132Z is an area for notifying the user of the sleep information for the day in question on which the user woke up, the sleep information over the predetermined period in the past, the lottery status of the user for the day in question, on which the relevant information was compared, and so on. For example, in the notification display section 132Z, the terminal device 10 notifies the user that the sleep information for the day in question on which the user woke up is "oo", the sleep information for the past week is "◆◆", the lottery status for the day in question on which the user woke up is "AA", and so on.

The lottery execution button 132C is an area in which the terminal device 10 receives an operation to execute a lottery from the user.

Thus, the sleep information of the user on the day in question can be specified on the basis of the wakeup time set by the user, and the parameters to be used in the game played by the user on the day in question and so on can be specified on the basis of the specified information and the sleep information over a predetermined period in the past. The parameters are specified on the basis of the user's own past sleep information rather than the average sleep information of other users, and therefore the user can play the game under different parameters each day. As a result, the game can be made more enjoyable, and the user can stay motivated to continue playing the game.

Example screen (B) is a diagram illustrating an aspect in which a reward for achieving the daily falling asleep time target is presented to the user.

As illustrated on example screen (B), the terminal device 10 displays the user name display section 132A, a falling asleep time display section 132D, a button 132E for setting a target falling asleep time for the day in question, and the notification display section 132Z on the display 132.

On example screen (B), the falling asleep time display section 132D displays a target falling asleep time set by the user after waking up the day before and the time at which the user actually fell asleep. For example, in the falling asleep time display section 132D, the terminal device 10 indicates that the target falling asleep time is "31 Mar. 2020, 22:00 pm" and the actual falling asleep time is "31 Mar. 2020 23:50 pm".

In the notification display section 132Z, the terminal device 10 presents the user with a specific reward on the basis of information indicating whether or not the daily falling asleep time target has been achieved and so on. In this case, the terminal device 10 may present the user with a reward for setting a target and so on as well as a reward for achieving the daily target in the notification display section 132Z. The terminal device 10 may also present the user with options relating to daily target setting. For example, in the notification display section 132Z, the terminal device 10 may give the user "oo" as a reward for setting a daily target in addition to the reward for achieving the daily target, and present the user with the option to set a new target for the day in question. Moreover, in certain aspects, the terminal device 10 may vary the rarity of the given reward or the like with respect to the reward for achieving the target and the reward for setting a target. In other words, a rarer item or the like may be given as the reward for achieving the target.

The button 132E for setting the falling asleep target of the day in question is an area in which the terminal device 10 receives an operation to set the falling asleep target of the day in question from the user.

Thus, the user can receive a reward for setting a target as well as achieving a target, and as a result, it can be expected that the game will become more enjoyable. Moreover, since the user sets the daily falling asleep target voluntarily, it can be expected that the user will lead a more regular lifestyle in order to achieve the target.

Example screen (C) is a diagram illustrating an aspect in which the user is presented with a reward for achieving the target falling asleep time over a predetermined period.

As illustrated on example screen (C), the terminal device 10 displays the user name display section 132A, a weekly falling asleep time display section 132F, a weekly target setting button 132G, and the notification display section 132Z on the display 132.

On example screen (C), the user sets a target falling asleep time over a predetermined period, for example a period of one week, and this target is displayed together with the actual falling asleep time over the period in the weekly falling asleep time display section 132F. The server 20 compares this information in order to specify whether or not the target has been achieved.

In the notification display section 132Z, the terminal device 10 presents the user with a specific reward on the basis of information indicating whether or not the target falling asleep time over the predetermined period has been achieved, and so on. In this case, the terminal device 10 may specify a difficulty level for the target falling asleep time over the predetermined period and present the user with the achievement reward on the basis of the difficulty level in the notification display section 132Z. Further, even when the user is unable to achieve the target, the terminal device 10 may give the user a specific item or the like as a reward for setting the target. The terminal device 10 may also present the user with options relating to setting a target falling asleep time over a predetermined period. For example, in the notification display section 132Z, the terminal device 10 may provide notification that the target falling asleep time over the predetermined period has been achieved, set the target difficulty as "C", and give "◆◆". The terminal device 10 may also provide notification of whether or not a new weekly target falling asleep time has been set on the notification display section 132Z.

The weekly target setting button 132G is an area in which the terminal device 10 receives an operation to set a target falling asleep time over a predetermined period from the user. In this area, the terminal device 10 may also receive from the user a setting of a unit of the predetermined period, for example a unit of one week or a unit of several days.

Thus, the user can set a target falling asleep time over a predetermined period as well as a daily target falling asleep time, and in so doing, the user can receive rewards not only in short-term units of one day or the like but along medium to long-term units. As a result, the game can be made more enjoyable, and it can be expected that the user will stay motivated to play the game.

Example screen (D) is a diagram illustrating an aspect in which the parameters for advancing the game are specified from the sleep information of the day in question, which is based on the time that the user woke up, and the sleep information over a predetermined period in the past, whereupon a character to be used to play the game is selected at random by lottery on the basis of the parameters and presented to the user.

As illustrated on example screen (D), the terminal device 10 displays the user name display section 132A, a user status display section 132H, a game play advancement button 1321, and the notification display section 132Z on the display 132.

On example screen (D), the user status display section 132H displays information indicating the wakeup time of the user on the day in question, information about sleep on the day in question, the lottery status of the user on the day in question, and so on. By referring to this screen, the user can check basic information required for the user to play the game on the day in question.

In the notification display section 132Z, the terminal device 10 displays the character to be used by the user to play the game on the day in question, which is specified by being selected at random by lottery on the basis of the aforementioned lottery status information, as well as the status thereof and so on. For example, in the notification display section 132Z, a character for prompting advancement of the game is displayed together with the words "Good morning!" on the left side of the screen, and the character to be used by the user is displayed together with the status (type, attack, defense, or the like) thereof on the right side of the screen. In this case, the terminal device 10 may also display information relating to a bonus accompanying achievement of a specific condition or the like, for example achieving the weekly target or the like, on the screen when the user achieves the condition.

Here, in the lottery processing for selecting the character to be used by the user to play the game on the day in question, the server 20 may also specify the likelihoods of specific characters appearing on a lottery table using the information about the lottery status or the sleep information of the day in question. In other words, when the user has a specific lottery status, when the sleep information of the day in question is specific information, and so on, the server 20 specifies the likelihood that a specific character, for example a limited character that does not appear in a normal lottery or a character that appears on the lottery table only when a numerical value takes a specific value, will appear.

Thus, not only do the characters that can be used to play the game on the day in question change according to the sleep state of the user and the lottery status on the day in question, but also, the user can use specific characters when the sleep information is specific information. As a result, the game can be made more enjoyable, and it can be expected that the motivation of the user to want to use a specific character will improve. As another result, the users reconsider their sleep information, or more specifically the time at which they fall asleep and so on, in order to use a specific character, and therefore improvements in the lifestyle habits of the users and so on can also be expected.

In certain aspects, the server 20 may vary the status of the character used by the user to play the game on the basis of the lottery status information or the sleep information of the day in question. For example, statuses such as attack and defense may be varied on the basis of the lottery status, and the types, abilities, and so on of the characters may be varied on the basis of the sleep information of the day in question. For example, the server 20 may vary the status as follows in accordance with the lottery status information and the sleep state on the day in question.

(1) The attack status or the like increases in comparison with that of the same character under normal circumstances.

(2) A character that normally has the "grass" type becomes the "grass, flying" type or the like.

(3) Abilities such as "natural cure", "serene grace", and so on are applied.

Thus, even when the same character is specified by lottery, the user can use a character with a changed status in accordance with the user's own sleep information and lottery status. As a result, it can be expected that the game will become more enjoyable.

The game play advancement button 1321 is an area in which the terminal device 10 receives an operation to advance the game play from the user.

MODIFICATION EXAMPLES

Modification examples of this embodiment will now be described. More specifically, the following aspects may be employed.

(1) With regard to the information processing device, the program may be installed therein either in advance or subsequently, and the program may be either stored on an external non-temporary storage medium or operated by cloud computing.

(2) With regard to the method, the method may cause a computer to function as the information processing device, the program may be installed in the information processing device either in advance or subsequently, and the program may be either stored on an external non-temporary storage medium or operated by cloud computing.

<Supplements>

The matters described in the above embodiments are supplemented as follows.

(Supplement 1)

A program executed by a computer that includes a processor, wherein the program causes the processor 19 to execute a step (S502) for acquiring daily sleep information from a user, a step (S551) for specifying a first parameter, which is a parameter to be used by the user to play a game, for each date by comparing sleep information of the user over a predetermined period with sleep information of the user for each date, and a step (S553, S503) for advancing the game on each date by performing lottery processing using the first parameter corresponding to the date.

(Supplement 2)

The program described in supplement 1, wherein, in the acquisition step (S502), information indicating that the user has woken up is acquired as the sleep information, in the specification step (S551), the first parameter is specified for the date on which the user woke up in response to acquisition of the information indicating that the user has woken up, and in the advancement step (S553, S503), the game played on the date on which the user woke up is advanced using the first parameter for the date in response to acquisition of the information indicating that the user has woken up.

(Supplement 3)

The program described in supplement 2, wherein, in the specification step (S551), the first parameter is specified in response to acquisition of the information indicating that the user has woken up by comparing the sleep information of the user over a predetermined period, which is a past period serving as a first period based on a first date on which the information was acquired, with the sleep information pertaining to the user waking up.

(Supplement 4)

The program described in supplement 3, wherein, in the specification step (S551), the first parameter is specified in response to acquisition of the information indicating that the user has woken up on a second date, which differs from the first date, by comparing the sleep information of the user over a predetermined period, which is a past period serving as a second period based on the second date on which the information was acquired, with the sleep information pertaining to the user waking up, and the first period and the second period are identical in length.

(Supplement 5)

The program described in supplement 1 or 2, wherein, in the advancement step (S553, S503), as the lottery processing, at least one of lottery processing for determining a character that is to appear in the game, lottery processing for determining the likelihood of a specific character appearing in the game, and lottery processing for correcting a parameter stored in association with the user is performed on the basis of the first parameter.

(Supplement 6)

The program described in supplement 1, wherein the program further causes the processor 19 to execute a step (S501) for receiving a setting of a target falling asleep time over a third period from the user.

(Supplement 7)

The program described in supplement 6, wherein the program further causes the processor 19 to execute a step (S504) for giving a reward to the user when, in the step for advancing the game (S553, S503), the user achieves the target received in the reception step (S501).

(Supplement 8)

The program described in supplement 6 or 7, wherein, in the reception step (S501), a target falling asleep time over a plurality of consecutive third periods in chronological order is received from the user using the third period as a unit.

(Supplement 9)

The program described in supplement 8, wherein, in the reception step (S501), whether or not a target is to be set is received from the user using the third period as a unit.

(Supplement 10)

A method executed by a computer that includes a processor 19, wherein the method causes the processor 19 to execute a step (S502) for acquiring daily sleep information from a user, a step (S551) for specifying a first parameter, which is a parameter to be used by the user to play a game, for each date by comparing sleep information of the user over a predetermined period with sleep information for each date, and a step (S553, S503) for advancing the game on each date by performing lottery processing using the first parameter corresponding to the date.

(Supplement 11)

An information processing device comprising a control unit 190, wherein the control unit 190 executes a step (S502) for acquiring daily sleep information from a user, a step (S551) for specifying a first parameter, which is a parameter to be used by the user to play a game, for each date by comparing sleep information of the user over a predetermined period with sleep information for each date, and a step (S553, S503) for advancing the game on each date by performing lottery processing using the first parameter corresponding to the date.

The invention claimed is:

1. A non-transitory computer-readable storage medium storing computer-readable instructions thereon which, when executed by a computer, causes the computer to perform a method, the method comprising:

acquiring daily sleep information from a user;

processing sensor data from a plurality of different sensors each having a unique ID, wherein the processing includes accumulating the sensing results from the plurality of different sensors to identify sleep states including light sleep, deep sleep, REM sleep, and non-REM sleep;

specifying a first parameter, which is a parameter to be used by the user to play a game, for each date by comparing sleep information of the user over a prede-
termined period with sleep information of the user for
each date to vary game parameters daily based on the
user's own past sleep information; and advancing the game on each date by performing lottery
processing using the first parameter corresponding to
the date.

2. The non-transitory computer-readable storage medium
according to claim 1, wherein acquiring daily sleep infor-
mation includes acquiring information indicating that the
user has woken up as the sleep information, wherein specifying the first parameter includes specifying
the first parameter for the date on which the user woke
up in response to acquisition of the information indi-
cating that the user has woken up, and wherein advancing the game includes advancing the game
played on the date that the user woke up using the first
parameter for the date in response to acquisition of the
information indicating that the user has woken up.

3. The non-transitory computer-readable storage medium
according to claim 2, wherein specifying the first parameter
includes specifying the first parameter in response to acquisition of
the information indicating that the user has woken up
by comparing the sleep information of the user over a
predetermined period, which is a past period serving as
a first period based on a first date on which the
information was acquired, with the sleep information
pertaining to the user waking up.

4. The non-transitory computer-readable storage medium
according to claim 3, wherein specifying the first parameter
includes specifying the first parameter in response to acquisition of
the information indicating that the user has woken up
on a second date, which differs from the first date, by
comparing the sleep information of the user over a
predetermined period, which is a past period serving as
a second period based on the second date on which the
information was acquired, with the sleep information
pertaining to the user waking up, and the first period and the second period are identical in
length.

5. The non-transitory computer-readable storage medium
according to claim 1, wherein the lottery processing for
advancing the game includes at least one of lottery processing for determining a char-
acter that is to appear in the game, lottery processing for determining the likelihood of a
specific character appearing in the game, and lottery processing for correcting a parameter stored in
association with the user is performed based on the first
parameter.

6. The non-transitory computer-readable storage medium
according to claim 1, further comprising:

receiving a setting of a target falling asleep time over a
third period from the user.

7. The non-transitory computer-readable storage medium
according to claim 6, further comprising:

giving a reward to the user for advancing the game in
response to the user achieving the target received.

8. The non-transitory computer-readable storage medium
according to claim 7, wherein receiving the target falling
asleep time includes receiving the target falling asleep time
over a plurality of consecutive third periods in chronological
order from the user using the third period as a unit.

9. The non-transitory computer-readable storage medium
according to claim 8, wherein receiving the target falling asleep time includes receiving whether or not a target is to
be set from the user using the third period as a unit.

10. A method, comprising:

acquiring daily sleep information from a user;

processing sensor data from a plurality of different sen-
sors each having a unique ID, wherein the processing
includes accumulating the sensing results from the
plurality of different sensors to identify sleep states
including light sleep, deep sleep, REM sleep, and
non-REM sleep;

specifying a first parameter, which is a parameter to be
used by the user to play a game, for each date by
comparing sleep information of the user over a prede-
termined period with sleep information for each date to
vary game parameters daily based on the user's own
past sleep information; and advancing the game on each date by performing lottery
processing using the first parameter corresponding to
the date.

11. An information processing device comprising process-
ing circuitry, wherein the processing circuitry is configured
to:

acquire daily sleep information from a user;

process sensor data from a plurality of different sensors
each having a unique ID;

accumulate the sensing results from the plurality of dif-
ferent sensors and identify sleep states including light
sleep, deep sleep, REM sleep, and non-REM sleep
based on the accumulated sensing results;

specify a first parameter, which is a parameter to be used
by the user to play a game, for each date by comparing
sleep information of the user over a predetermined
period with sleep information for each date to vary
game parameters daily based on the user's own past
sleep information; and advance the game on each date by performing lottery
processing using the first parameter corresponding to
the date.

12. The information processing device of claim 11,
wherein the processing circuitry is further configured to specify the first parameter for the date on which the user
woke up in response to acquisition of the information
indicating that the user has woken up, and advance the game played on the date that the user woke
up using the first parameter for the date in response to
acquisition of the information indicating that the user
has woken up.

13. The information processing device of claim 12,
wherein the processing circuitry is further configured to specify the first parameter in response to acquisition of the
information indicating that the user has woken up by
comparing the sleep information of the user over a
predetermined period, which is a past period serving as
a first period based on a first date on which the
information was acquired, with the sleep information
pertaining to the user waking up.

14. The information processing device of claim 13,
wherein the processing circuitry is further configured to specify the first parameter in response to acquisition of the
information indicating that the user has woken up on a
second date, which differs from the first date, by
comparing the sleep information of the user over a
predetermined period, which is a past period serving as
a second period based on the second date on which the
information was acquired, with the sleep information
pertaining to the user waking up, wherein the first period and the second period are identical in length.

15. The information processing device of claim 11, wherein the lottery processing for advancing the game includes at least one of lottery processing for determining a character that is to appear in the game, lottery processing for determining the likelihood of a specific character appearing in the game, and lottery processing for correcting a parameter stored in association with the user is performed based on the first parameter.

16. The information processing device of claim 11, wherein the processing circuitry is further configured to receive a setting of a target falling asleep time over a third period from the user.

17. The information processing device of claim 16, wherein the processing circuitry is further configured to give a reward to the user for advancing the game in response to the user achieving the target received.

18. The information processing device of claim 17, wherein the processing circuitry is further configured to receive the target falling asleep time over a plurality of consecutive third periods in chronological order from the user using the third period as a unit.

19. The information processing device of claim 18, wherein the processing circuitry is further configured to receive whether or not a target is to be set from the user using the third period as a unit.

*   *   *   *   *